L. A. YOUNG.
RIM STRIP.
APPLICATION FILED NOV. 29, 1918.

1,313,973.

Patented Aug. 26, 1919.

Inventor
Leonard A. Young.
By Stuart E. Barnes
Attorney

UNITED STATES PATENT OFFICE.

LEONARD A. YOUNG, OF HIGHLAND PARK, MICHIGAN, ASSIGNOR TO L. A. YOUNG INDUSTRIES, INC., OF DETROIT, MICHIGAN, A CORPORATION OF MICHIGAN.

RIM-STRIP.

1,313,973.  
Specification of Letters Patent.  Patented Aug. 26, 1919.

Application filed November 29, 1918. Serial No. 264,531.

*To all whom it may concern:*

Be it known that I, LEONARD A. YOUNG, a citizen of the United States, residing at Highland Park, county of Wayne, State of Michigan, have invented a new and useful Improvement in Rim-Strips, of which the following is a specification.

This invention relates to rim strips for cushion springs, and has for its object a rim strip provided with a tacking strip and means for holding the bottom coils of the springs in position.

It is quite old in this art to employ a channel strip as a rim strip which carries a wooden tacking strip for the upholstering and is provided with projecting or struck-out portions adapted to be pinched over the bottom coil of an adjacent spring. It is also old to employ an S shaped strip in cross section, one channel to hold the tacking strip and the other to support the springs. This latter form of construction is open to the objection that it requires a large amount of extra material. Channel strips which have struck-out portions for engaging springs are either open to the objection that they are almost impossible to manufacture or else they leave an open space back of the tacking strip so that the points of the tacks are not clenched as is desired. It is the object of this invention to secure all the advantages of a rim strip of this character but avoid the disadvantages and afford one of minimum cheapness.

In the drawings,—

Figure 3:
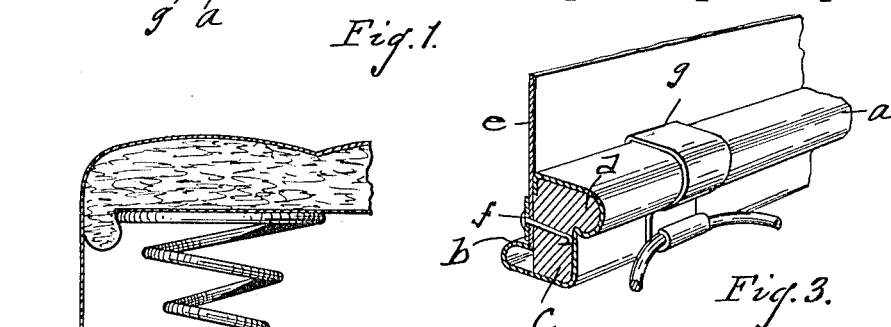
Fig. 3 is a sectional perspective of a portion of the rim strip showing the spring hanger clips.

The rim strip comprises a channel strip with the opening facing outward and formed to be wider at the top than at the bottom, forming at the top rear corner a large bead *a*. The bottom outward corners are folded back upon themselves to form a protecting lip or fold *b* for the upholstering. Within the channel is fitted a strip of wood *c* preferably having a bead *d* to fit into the bead of the channel strip. An upholstering skirt *e* can be tacked to the tacking strip and the tacks *f* which will strike the uninterrupted back of the channel strip will be clenched over as shown in Fig. 3 so that they will not be readily pulled out.

Figure 1:
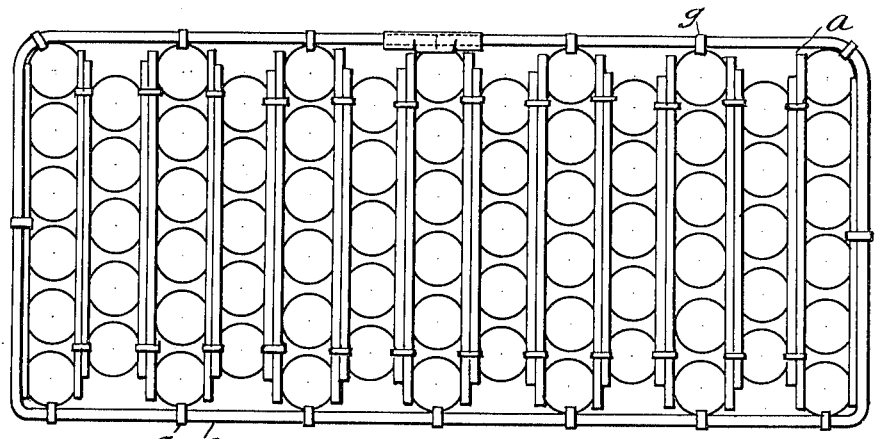
Figure 1 is a plan view of the spring cushion.
Figure 2:
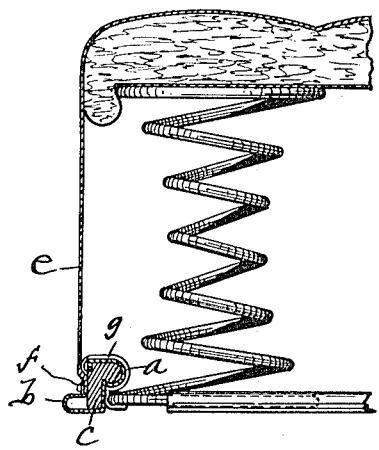
Fig. 2 is a vertical fragmentary section of the same.

A channel strip of this character can be readily manufactured and easily bent around the corners. The purpose of the bead in the tacking strip and in the channel strip is to afford a grip for the hanger clips *g*. These being fairly deeply set in under the bead as shown in Fig. 2, and being made of fairly heavy gage metal, it is impossible for them to pull off from the channel strip but at the same time they do not run over the face of the tacking strip. A clip construction which merely binds the springs around the rim strip in a ring-like way would very seriously interfere with the tacking of the upholstering to the tacking strip as obviously it could not very well be tacked through the clip when a plaited upholstering skirt is used. The tack usually has to be located at the place the plait brings it; it cannot very well be shifted. In the hanger form of clip shown in Fig. 3 not only is this object of avoiding passing over the tacking strip accomplished but the clip does not even pass over the bottom of the rim so as to make that member uneven.

Figure 4:
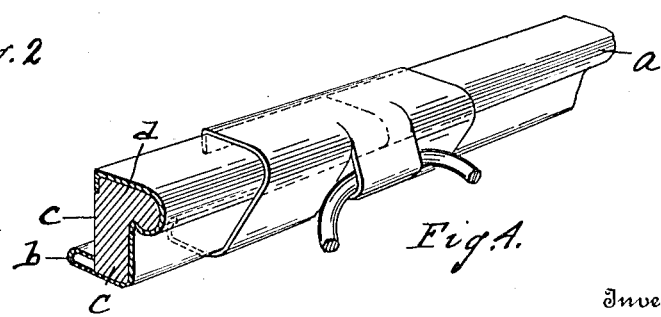
Fig. 4 shows the form of clip used at the back of the cushion where the ends of the rim strip join.

In Fig. 4, where the joining of the two ends of the rim strip is shown, a larger clip is shown for binding the two ends of the upholstering together, and this clip shows that the spring may be held in place by a clip which passes about three-quarters of the way around the rim strip but does not pass over the opening in the channel strip so as to interfere with the tacking strip.

What I claim is:

1. A rim strip, comprising a metal channel bar, a tacking strip contained within the channel strip and a spring supporting clip substantially conforming to and gripping the exterior of the channel strip.

2. A rim strip comprising a metal channel strip having inturned marginal portions along the margins of the side flanges, a tacking strip retained within the body of the channel strip by said marginal portions and a spring supporting clip conforming substantially to the exterior of the channel strip with the inturned end portions of the clip engaging against the contiguous portions of the inturned marginal portions of the channel strip.

3. A rim strip comprising a metal channel bar having substantially parallel sides with inturned marginal separated retaining flanges, a tacking strip secured in the body of the channel strip by said inturned portions and a hanger clip snapped over the channel strip to which it substantially conforms with inturned end portions corresponding to and contacting with the retaining flanges of the channel.

4. A rim strip, comprising a metal channel strip, a tacking strip held within the channel strip, and a spring supporting clip engaging over the outside of the channel strip on practically only the solid walls of the strip so as not to pass over the opening for the tacking strip.

5. A rim strip, comprising a channel strip formed at the rear into a bead at the top, a tacking strip contained within the channel strip, and a hanger adapted to run over the top of the strip over and under the bead and having its lower end arranged to be pinched onto an adjoining member.

In witness whereof I have hereunto set my hand on the 22nd day of November, 1918.

LEONARD A. YOUNG.